United States Patent Office 3,254,045
Patented May 31, 1966

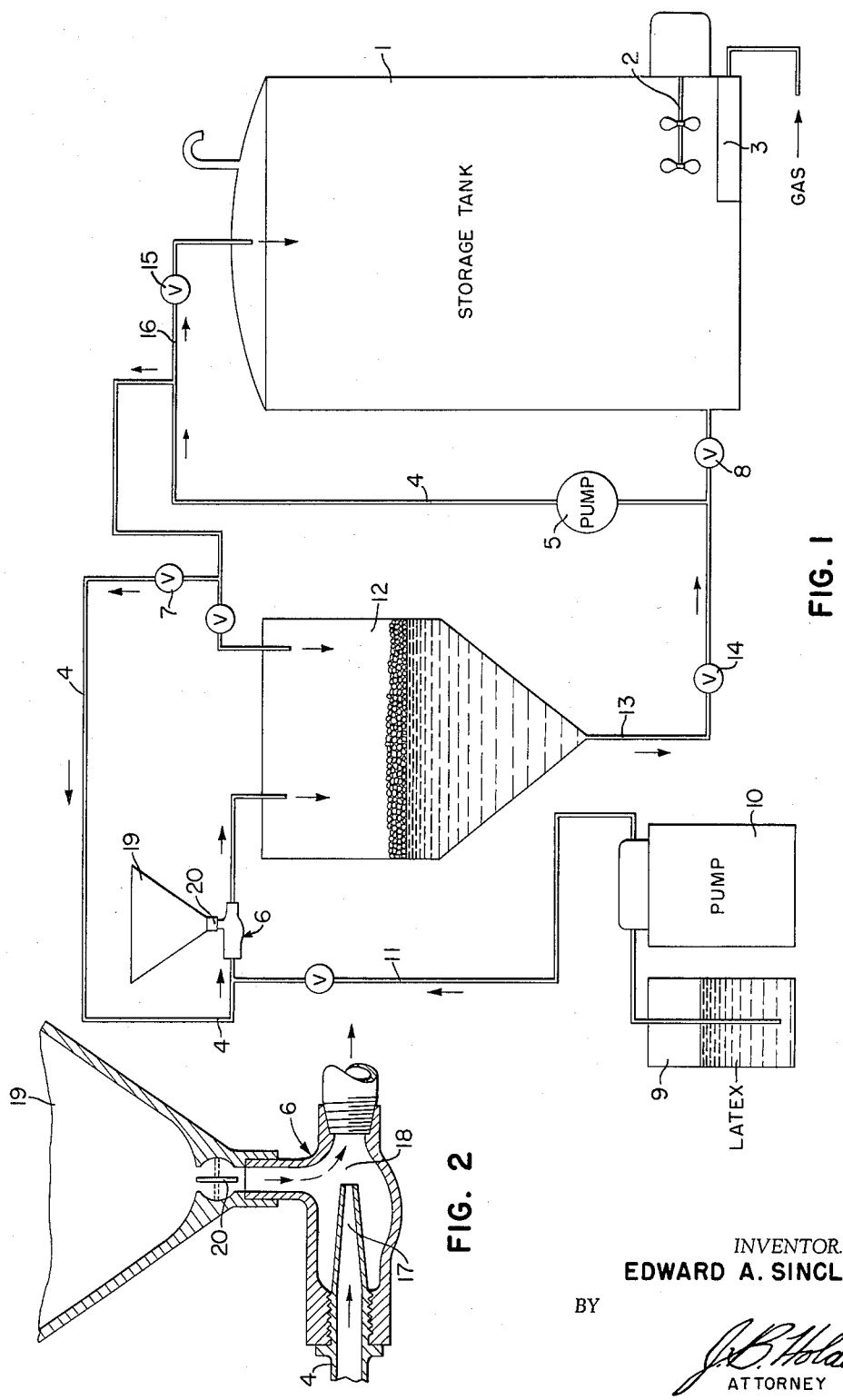

3,254,045
METHOD FOR MANUFACTURE OF RUBBERIZED BITUMEN
Edward A. Sinclair, Kent, Ohio, assignor to The Goodyear Tire & Rubber Company, Akron, Ohio, a corporation of Ohio
Filed Dec. 26, 1962, Ser. No. 246,929
6 Claims. (Cl. 260—28.5)

This invention relates to a process and apparatus for rubberizing fluidizable bitumen. More particularly, this invention relates to a process and apparatus for the addition of latex to a moving stream of hot fluid bitumen and controlling the flow of the resulting mixture to obtain disengagement of water vapor from the rubberized bitumen under controlled foaming conditions.

It is generally known that certain physical properties of bitumen are improved by the incorporation of rubber or elastomers. Normally the addition of about 1–5% by weight of elastomer is sufficient to give a significant improvement in physical properties of the bitumen, for example, in the ductility and toughness thereof. Although as little as about 0.1% may be used for some purposes, it is preferred to use about 0.75% to 2%. It is known also that good results are obtained when the rubber or elastomer is added to the bitumen as a latex and at temperatures and conditions which do not cause appreciable degradation of the rubber latex. Most latices contain at least about 20%, or as much as 75 to 80% by weight of water. This water causes troublesome foaming during the addition of the latex to the hot bitumen. Consequently, foaming of the fluid bituminous material results in considerable delay while the water is evaporated and slows the rate of addition of latex to the hot bitumen. To avoid use of latices, recently so-called powdered rubbers have been used to manufacture rubberized bitumen but it should be appreciated that the addition of powdered unvulcanized rubber to molten bitumen frequently presents the problem of the powder settling in the bottom of the mixing tank.

Therefore, a principal object of this invention is to provide a process and apparatus for incorporating unvulcanized rubber either as a latex or a free-flowing powder in hot bituminous materials without experiencing difficulties from foaming due to the presence of moisture or settling of the unvulcanized rubber powder.

A further object of this invention is to provide a process and apparatus whereby the latex can be added to a molten stream of bitumen under conditions that control the amount of foam generated, said apparatus also being satisfactory for rubberizing molten bitumen with powdered rubber.

Hence, the method and apparatus of this invention permits the addition of unvulcanized rubber to be made under uniform and controlled conditions without incurring the explosive hazards due to the accumulation of the water in the bitumen and its sudden vaporization when the temperature of the bitumen is raised to about 250° F. or higher. Also, this method permits lower operating temperatures to be used and thereby avoids degradation of the unvulcanized rubber.

Still further objects of this invention will be apparent from the following description of the drawings and operation of the apparatus of this invention wherein FIG. 1 is a schematic diagram of the equipment used to rubberize bitumen and FIG. 2 is a detailed view of the eductor and the adjacent piping.

The objects of this invention are obtained (1) by forming a moving stream of hot molten bituminous material, (2) adding the unvulcanized rubber either as a latex or a free-flowing powder to the moving stream at a controlled rate, (3) then immediately moving the resulting mixture through at least one zone where the velocity of the bitumen is increased and the bitumen is exposed to the atmosphere, (4) continuing the movement of the resultant mixture to and through an enclosed zone to vaporize a substantial amount of the water remaining in the mixture and to disperse the rubber within the mixture, and then (5) discharging the moving body into a nonrestrictive zone to release the remaining water as steam. Preferably these objects are obtained by forming the moving stream in an enclosed zone, then adding the latex to the moving stream immediately prior to or during the time the stream velocity has increased with the moving stream being opened to the atmosphere at least part of the time the velocity of the stream was increased. The moving stream slows down as it passes beyond the point where it is opened to the atmosphere but the stream is maintained under restrictions until it is discharged into the nonrestricted zone. The temperature of the moving stream should be no higher than about 350 to 400° F. Although slightly higher or lower temperatures may be used where the disadvantages experienced with the use of higher or lower temperatures can be tolerated. The preferred operating temperature is about 275 to 350° F. as the rubber is less susceptible to degradation at this temperature than at higher temperatures.

The bituminous materials useful in this invention are any of those well known to the art, such as coal tar pitches, pyrogenous asphalts, native asphalts, etc. Specific examples of these are the asphalts obtained from petroleum crude oils, crack tars, gas oil tars, coke oven tars, Trinidad asphalts, etc. Normally, the preferred asphalts and bitumen are those satifactory for use in building roads, lining canals, roofing, and related uses which meet the State and Federal Government specifications, and frequently referred to in the trade as AC, RC, MC and SC type asphalts and cut-back bituminous materials, i.e., bitumen containing hydrocarbons boiling from about 80° to 720° F.

Any rubber or elastomeric type latex such as the co- or homopolymers of dienes may be used but those latices which have lower cost are generally preferred since one of the disadvantages of rubberized bituminous materials is their inherently higher cost. Natural rubber latices, butadiene-styrene latices, i.e. GR–S latices, polybutadiene latices, butadiene-acrylonitrile latices and polyisoprene latices are representative examples of useful latices. The diene type latices usually contain about 20–35% by weight of rubber unless they have been concentrated to say, 50 to 80%. These latices by the method of this invention yields exceptionally good results as rubberization can be achieved at lower temperatures than by the prior art pressurized methods.

Normally the latices made by the homopolymerization or copolymerization of acrylonitrile are preferred with the coal tar bitumen since these latices give a specific enhancement to the physical properties of the coal tar bitumen.

The operation of this invention may be more clearly understood by reference to FIG. 1 wherein numeral 1 represents a bitumen storage tank equipped with a motor driven stirrer 2 and a gas-fired heater 3. Pump 5 moves the bitumen stored in tank 1 by line 4 to eductor 6 when valves 7 and 8 are open. Pump 10 injects the latex from storage tank 9 by line 11 into line 4 a short distance (normally no more than about 1 or 2 feet and preferably only a few inches) in front of the point where line 4 connects to the eductor 6. With the bitumen flowing through the eductor and latex being added by line 11 and valve 20 of the eductor being open, the resulting latex bitumen mixture passes through the eductor and its connecting pipe to be discharged into cone-shaped open top tank 12. The latex bitumen mixture dropping into tank 12 permits the water which has vaporized within the mixture to be released as steam. The resulting intimately mixed unvulcanized rubber and bitumen mixture is withdrawn from tank 12 by line 13 when valve 14 is open and is passed by line 4 through the eductor or is returned to storage tank 1 when valve 15 in line 16 is open. Thus, by properly setting valves 7, 8 and 15 the rubberized bitumen can be recycled to the eductor as well as the storage tank.

Reference to FIG. 2 shows that the bitumen flowing through line 4 has injected into it latex from the line 11 and this mixture immediately passes into the restrictive zone 17 of the eductor which increases the flow rate of the mixture and causes a drop in pressure inside the eductor in the zone 18. This drop in pressure facilitates the vaporization of the water in the latex bitumen mixture and thereby effects release of steam from the eductor when valve 20 is open. It is desirable that the flow rate through the eductor be high enough to suck in air and incorporate the air into the resulting mixture. Incorporation of air in the latex bitumen mixture facilitates the disengagement of the water vapor or steam within tank 12. Steam is also evolved through funnel when air is sucked in.

*Example I*

Ten thousand gallons of a petroleum asphalt produced by Cosden Petroleum Company having an ASTM penetration at 77° F. of 184 and a ductility at 39.2° F. of 12 centimeters was rubberized in the apparatus of FIG. 1 with 6 drums of a butadiene-styrene latex containing 69.2% total solids and having a viscosity of 1340 centipoises at 77° F. The asphalt in storage tank 1 was heated by the gas burner 3 to about 355° F., then pump 5 was started and the asphalt was pumped through the eductor 6 by line 4 into tank 12 and recycled to storage tank 1. The rate of pumpage of the asphalt and latex was adjusted so that about 42 gallons of latex was added every 35 to 45 minutes. The latex was added intermittently as some time elapsed while each drum was moved into position to be attached to pump 10. This rate of pumpage permitted all the latex to be added within 4 hours and 25 minutes and all the foam to be dissipated within five hours from the initial addition of the latex. During the circulation of the asphalt the temperature in the storage tank dropped from 355 to 295° F. This rubberized asphalt was recycled overnight from the bottom to the top of the storage tank with the temperature being held at about 290° F. The next morning the temperature was raised to 375° F. and the rubberized asphalt was applied on a farm-to-market road as a seal coat. The resulting coal coat on this road was approved by the state authorities. Also, this rubberized asphalt had an ASTM penetration at 77° F. of 166 and a ductility at 39.2° F. of 150+ centimeters.

*Example II*

In this example the piping arrangement of FIG. 1 was used except the latex was added through the funnel 19 of the eductor instead of by line 11 and tank 12 was by-passed and tank 1 was used to separate out steam vapor. Three hundred gallons of MC–5 asphalt was heated to 265° F. in the storage tank 1 and pumped through the eductor and back into the top of the tank 1. It should be noted that MC–5 is a cut-back asphalt, i.e. one containing a hydrocarbon solvent, therefore lower temperatures could be used. The rate of pumpage of the cut-back was about 100 gallons per minute and the latex was added to the funnel at 2.4 gallons per minute. This rate of pumpage of asphalt and latex gives a resulting mixture containing approximately 2% rubber. This rate of addition caused a back pressure to develop in the funnel, therefore the rate of latex addition was reduced until a slight sucking action was heard during the addition of the latex. At this rate of addition the funnel was filled with a cloud of steam. At this rate of addition 65 pounds of a 69% solid butadiene-styrene latex was added in about 10 to 15 minutes. Under these latex addition conditions a thousand gallons of MC–5 asphalt could be rubberized in about 30 minutes. After the last latex was added the rubberized asphalt was recirculated for 30 minutes and the temperature was raised to 300° F. as it had decreased to about 250° F. during the latex addition. While the rubberized asphalt was being recirculated, samples were taken at 5, 30 and 60 minutes after the last addition of latex. Microscopic observation of these samples showed that after 60 minutes recirculation uniform distribution of the rubber within the asphalt had been obtained with the rubber being essentially microscopically dispersed in the asphalt.

It should be noted that this apparatus and method of adding latex to hot bitumen permits cut-back bitumen to be rubberized at relatively low pressures whereas the prior art has taught a pressurized method must be used.

A dry powered unvulcanized rubber obtained by coagulation of a rubber latex with a diatamaceous earth was added to the hot bitumen by the apparatus of FIG. 1. This power containing about 80% of unvulcanized 75/25 butadiene-styrene rubbery copolymer and 20% mica was added through funnel 19 and was found to be intimately dispersed in the rubberized asphalt after about an hour's recirculation time.

While certain representative embodiments and details have been shown for the purpose of illustrating the invention it will be apparent to those skilled in this art that various changes and modifications may be made therein without departing from the spirit or scope of the invention.

What is claimed is:

1. A method of manufacturing rubberized bitumen comprising the steps of
    (1) introducing elastomeric latex into an enclosed moving body of molten bitumen having a temperature sufficiently high to evaporate the water,
    (2) moving the resultant mixture immediately through at least one zone of restriction open to the atmosphere whereby the movement of the resultant body is speeded up and at least part of the water is released;
    (3) continuing the movement of the resultant body through an enclosed zone to vaporize the rest of the water present in the body; and
    (4) discharging the moving body into a non-restricted zone to release the remaining water as steam.

2. The method of claim 1 wherein the temperature of the molten bitumen is maintained at about 250 to 400° F.

3. The method of claim 1 wherein the temperature of the molten bitumen is maintained at about 275 to 350° F.

4. The method of claim 1 wherein the bitumen is cut back with a hydrocarbon boiling from about 80° F. to 720° F.

5. A method of manufacturing rubberized bitumen comprising the steps of
    (1) moving a body of molten bitumen having a temperature in excess of about 250° F. and no higher than about 400° F. through an enclosed zone to a more restrictive zone whereby the velocity of the moving body is increased with the moving body being in contact with the atmosphere,
    (2) adding a free flowing unvulcanized rubbery polymer to the moving body of bitumen within the more restricted zone,
    (3) moving the resulting mixture through a further enclosed zone to complete the mixing of the rubbery polymer and bitumen; and
    (4) discharging the moving body into a non-restricted zone.

6. A method of manufacturing rubberized bitumen comprising the steps of
(1) moving a body of molten bitumen having a temperature in excess of about 250° F. and no higher than about 400° F. through an enclosed zone to a more restrictive zone whereby the velocity of the moving body is increased with the moving body being in contact with the atmosphere, and
(2) adding a free flowing unvulcanized rubbery polymer to the moving body of bitumen within the more restricted zone.

References Cited by the Examiner

UNITED STATES PATENTS

| 2,797,140 | 6/1957 | Veatch | 259—4 |
| 2,921,313 | 1/1960 | Odasz | 260—28.5 |
| 2,921,105 | 1/1960 | Benson | 260—758 |
| 3,015,539 | 1/1962 | Snyder | 23—252 |

MORRIS LIEBMAN, *Primary Examiner.*

D. C. KOLASCH, *Examiner.*

B. A. AMERNICK, *Assistant Examiner.*

Dedication 3,254,045.—*Edward A. Sinclair*, Kent, Ohio. METHOD FOR MANUFACTURE OF RUBBERIZED BITUMEN. Patent dated May 31, 1966. Dedication filed Jan. 17, 1969, by the assignee, *The Goodyear Tire & Rubber Company*.

Hereby dedicates to the people of the United States the entire term of said patent.

[*Official Gazette June 10, 1969.*]